(12) United States Patent
Beckley et al.

(10) Patent No.: US 7,527,286 B2
(45) Date of Patent: May 5, 2009

(54) AIR BAG DOOR AND CHUTE

(75) Inventors: Daniel V. Beckley, Fenton, MI (US); Martin Burke, Howell, MI (US)

(73) Assignee: Intier Automotive Inc., Newmarket (CA)

( * ) Notice: Subject to any disclaimer, the term of this patent is extended or adjusted under 35 U.S.C. 154(b) by 426 days.

(21) Appl. No.: 11/189,298

(22) Filed: Jul. 26, 2005

(65) Prior Publication Data

US 2006/0022438 A1    Feb. 2, 2006

(51) Int. Cl.
   *B60R 21/215*  (2006.01)
   *B60R 21/205*  (2006.01)

(52) U.S. Cl. .................... 280/728.3; 280/732

(58) Field of Classification Search .............. 280/728.3, 280/732
   See application file for complete search history.

(56) References Cited

U.S. PATENT DOCUMENTS

| | | | |
|---|---|---|---|
| 5,275,432 A * | 1/1994 | Pray et al. ................ | 280/728.2 |
| 5,280,946 A   | 1/1994 | Adams et al. | |
| 5,303,951 A * | 4/1994 | Goestenkors et al. .... | 280/728.3 |
| 5,445,409 A * | 8/1995 | Abramczyk et al. ..... | 280/728.2 |
| 5,527,064 A * | 6/1996 | Kai et al. ................ | 280/728.2 |
| 5,641,178 A * | 6/1997 | Lee .......................... | 280/728.3 |
| 5,887,891 A * | 3/1999 | Taquchi et al. ........... | 280/728.2 |
| 5,915,724 A * | 6/1999 | Daris et al. .............. | 280/728.3 |
| 6,189,916 B1  | 2/2001 | Bowers et al. | |
| 6,354,623 B1* | 3/2002 | Delmastro ................ | 280/732 |
| 6,364,351 B1* | 4/2002 | Hier et al. ................ | 280/732 |
| 6,398,256 B1* | 6/2002 | Saito ....................... | 280/732 |
| 6,409,208 B1* | 6/2002 | Frisch et al. ............. | 280/728.2 |
| 6,467,801 B1  | 10/2002 | Preisler et al. | |
| 6,557,886 B1* | 5/2003 | Sakaguchi ............... | 280/728.2 |
| 6,572,136 B2* | 6/2003 | Inoue et al. .............. | 280/728.2 |
| 6,688,640 B1* | 2/2004 | Davis et al. .............. | 280/728.3 |
| 6,902,185 B2  | 6/2005 | North | |
| 2003/0205890 A1* | 11/2003 | Davis et al. ............. | 280/732 |
| 2004/0124613 A1 | 7/2004 | Cowelchuk | |
| 2004/0145164 A1 | 7/2004 | North | |
| 2004/0188986 A1* | 9/2004 | Rogers et al. ........... | 280/728.3 |
| 2005/0225062 A1* | 10/2005 | Dumbrique ............. | 280/728.3 |

* cited by examiner

*Primary Examiner*—Ruth Ilan
(74) *Attorney, Agent, or Firm*—Honigman Miller Schwartz and Cohn LLP

(57) ABSTRACT

An inflatable restraint assembly includes an air bag door and chute. The air bag door includes at least one fastener integrally-formed with the air bag door. The chute is adapted to receive the at least one fastener to effect an interlock for retaining the air bag door to the chute. A method for manufacturing the inflatable restraint assembly is also disclosed. A method for assembling the inflatable restraint assembly is also disclosed.

13 Claims, 5 Drawing Sheets

AIR BAG DOOR AND CHUTE

TECHNICAL FIELD

The present invention generally relates to inflatable restraints. More particularly, the invention relates to an inflatable restraint assembly including an air bag door and chute.

BACKGROUND

In automotive vehicles, an inflatable restraint is typically located behind an instrument panel. Upon being discharged, the inflatable restraint, which is commonly referred to as an air bag, is directed through a chute and into the passenger compartment through an opening formed in the instrument panel. As seen in FIGS. 6 and 7, it is known in the art that the opening of an inflatable restraint assembly 1 may comprise a door 2 including a panel 3, chute periphery 4, and chute surround 5. Referring to FIG. 7, the chute periphery 4 is fastened to the panel 3 by at least one fastener 6, which results in a four-piece inflatable restraint assembly 1. The fastener 6 may be a screw, rivet, heatstake, or the like. If a heatstake, the fastener 6 is welded via any desirable technique, such as, for example, ultrasonic welding.

Although adequate for most applications, the inflatable restraint assembly 1 requires at least four parts (i.e. the panel 3, the chute periphery 4, the chute surround 5, and the fastener 6). Additionally, the conventional assembly 1 may include dissimilar materials, such as a thermoplastic resin for the chute periphery 4 and steel for the panel 3 and chute surround 5, which may increase manufacturing complexities. Even further, a secondary fastening operation, such as the fastening of the chute periphery 4 to the panel 3 via the fastener 6 may be required as well. As such, a need exists for an improved inflatable restraint assembly 1 that reduces the number parts, materials, and manufacturing operations.

BRIEF DESCRIPTION OF THE DRAWINGS

The present disclosure will now be described, by way of example, with reference to the accompanying drawings, in which.

DESCRIPTION OF THE PREFERRED EMBODIMENT

Figure 1:
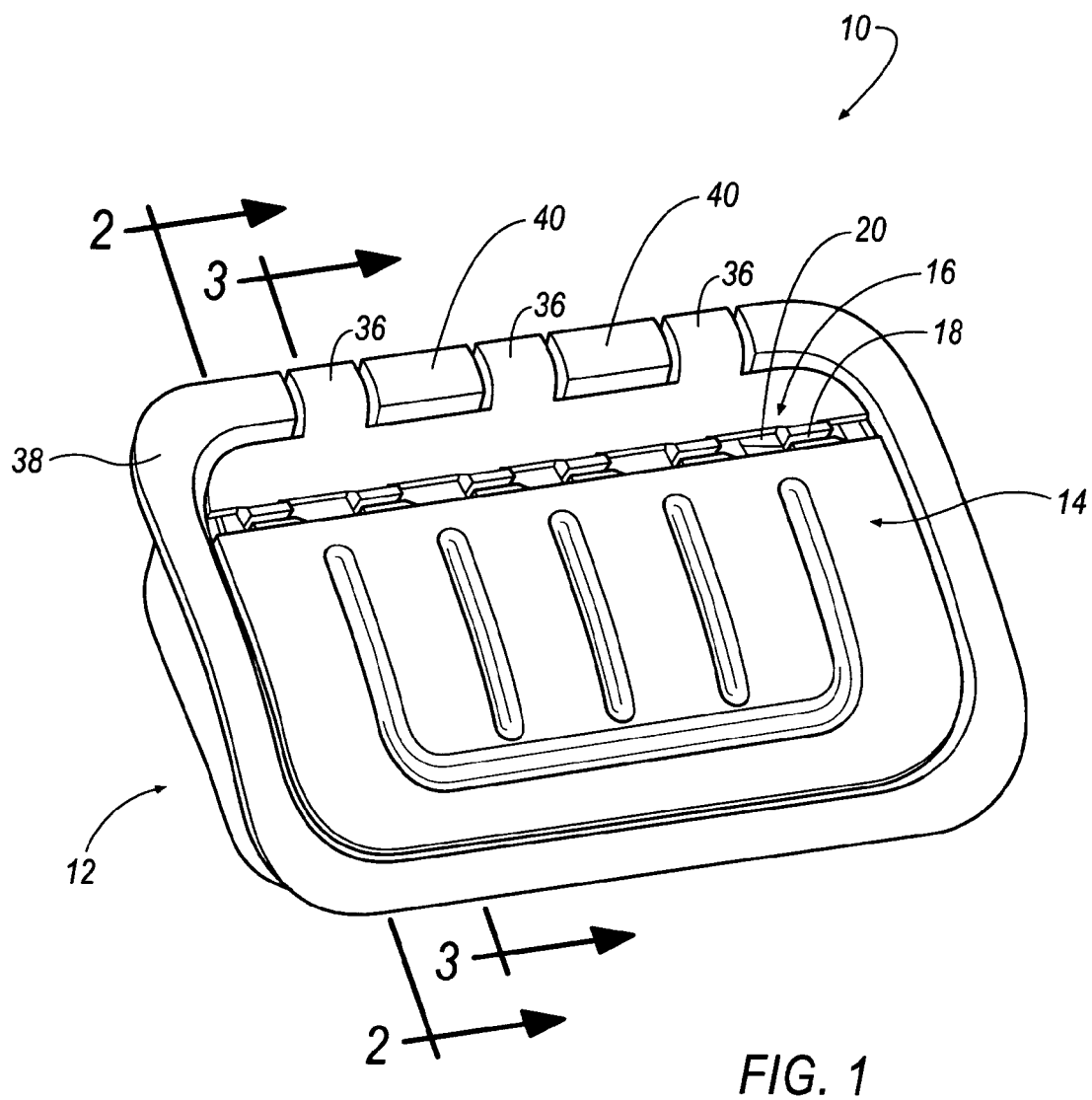
FIG. 1 is a front perspective view of an inflatable restraint assembly comprising an airbag door and a chute according to an embodiment.
Figure 2:
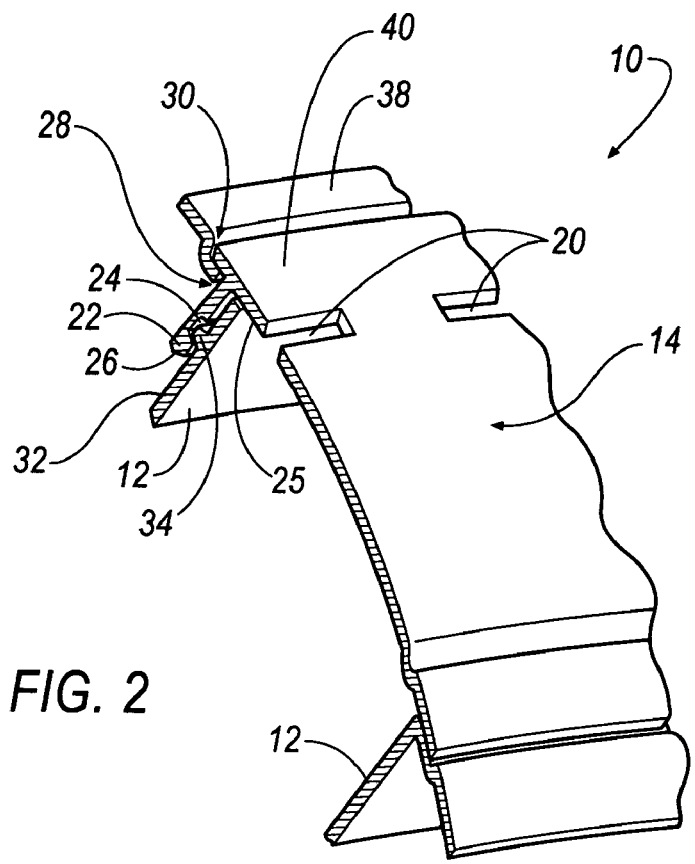
FIG. 2 is a cross-sectional perspective view of the inflatable restraint assembly, taken along line 2-2 of FIG. 1.
Figure 3:
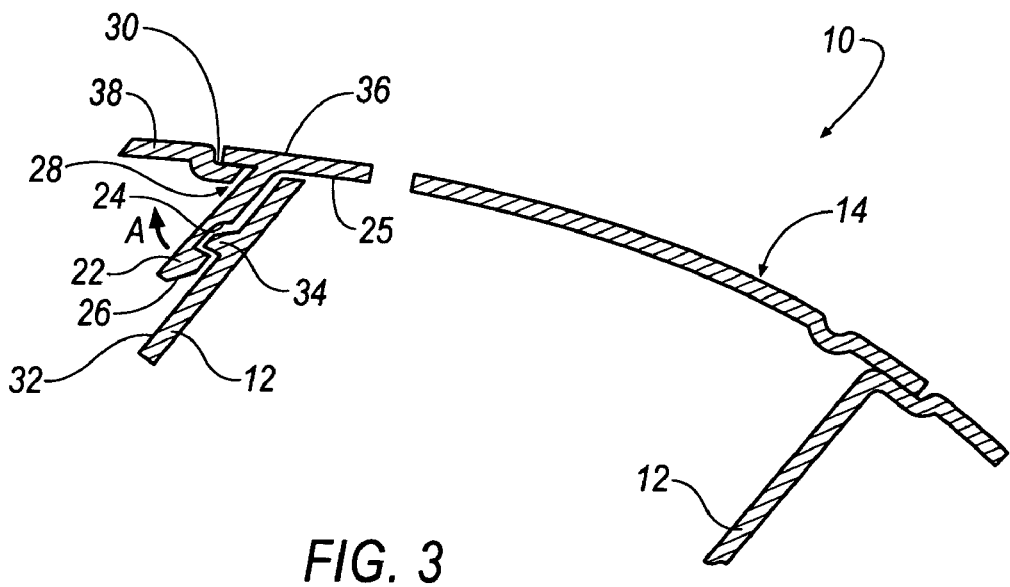
FIG. 3 is a cross-sectional view of the inflatable restraint assembly taken line 3-3 of FIG. 1.

The above described disadvantages are overcome and a number of advantages are realized by an inflatable restraint assembly, which is seen generally at 10 in FIGS. 1-3. According to an embodiment, the inflatable restraint assembly 10 comprises a similar material and is molded by a mold tool. According to another aspect of the embodiment, a two-piece inflatable restraint assembly 10 is realized. According to yet another aspect of the embodiment, an interlocking feature is realized by the inflatable restraint assembly 10 that eliminates secondary fastening operations and fastening equipment.

Figure 4A:
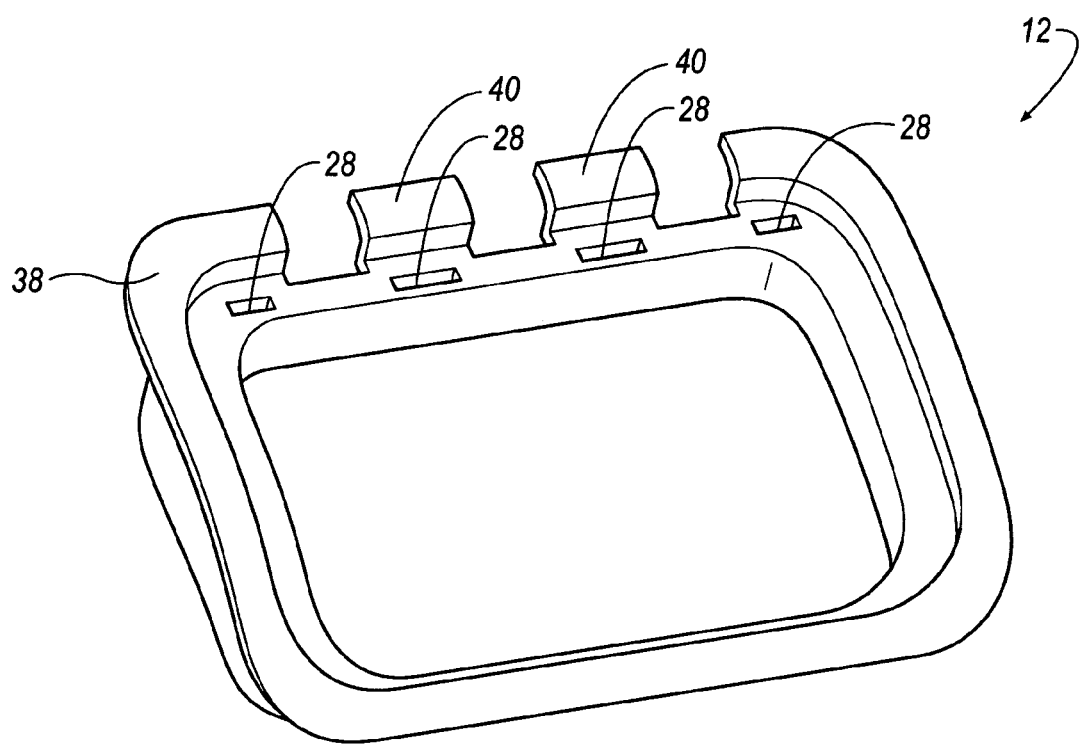
FIG. 4A is a front perspective view of the chute shown in FIG. 1.
Figure 4B:
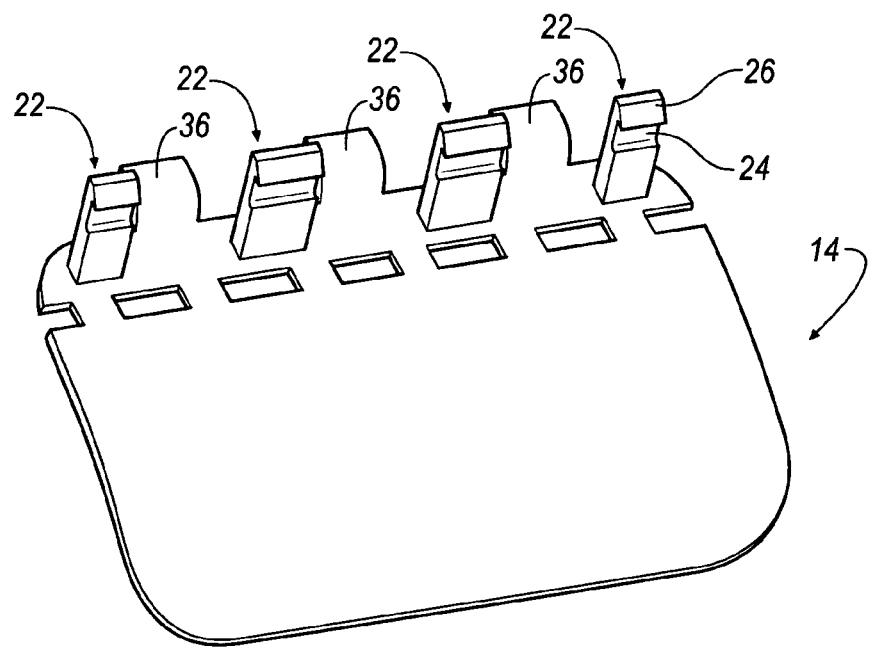
FIG. 4B is a rear perspective view of the air bag door shown in FIG. 1.

As illustrated, the two-piece inflatable restraint assembly 10 includes a chute 12 (FIG. 4A) and an air bag door 14 (FIG. 4B). The air bag door 14 includes a hinge, which is seen generally at 16 in FIG. 1, that includes bridge sections 18 and openings 20. As seen in FIGS. 2 and 3, the door 14 includes at least one integrally-formed fastener 22 that extends substantially perpendicularly away from an inboard surface 25 of the door 14. In the illustrated embodiment, the fastener 22 comprises a snap tab 22 that includes a notched section 24 and a ramped end 26. It will be appreciated that the integrally-formed fastener 22 can be in the form of any shape to effect an interlock between the air bag door 14 and the chute 12.

To assemble the inflatable restraint assembly 10, the snap tabs 22 are inserted into respective snap tab passages 28 that are formed in a recessed upper perimeter 30 of the chute 12. An outboard perimeter 32 of the chute 12 includes at least one rib 34 that is aligned with each of the respective snap tab passages 28. As a result, upon inserting snap tabs 22 into the snap tab passages 28, the ramped end 26 flexes away from the ribs 34 in the direction of the arrow, A, and, upon passing the ramped end 26, the snap tab 22 flexes in the reverse direction of the arrow, A, such that the rib 34 is located into the notched section 24 of the snap tab 22. As a result, the chute 14 frictionally engages the door 12, thereby creating an interlocked inflatable restraint assembly 10 to retain the door 12 to the chute 14.

Figure 5A:
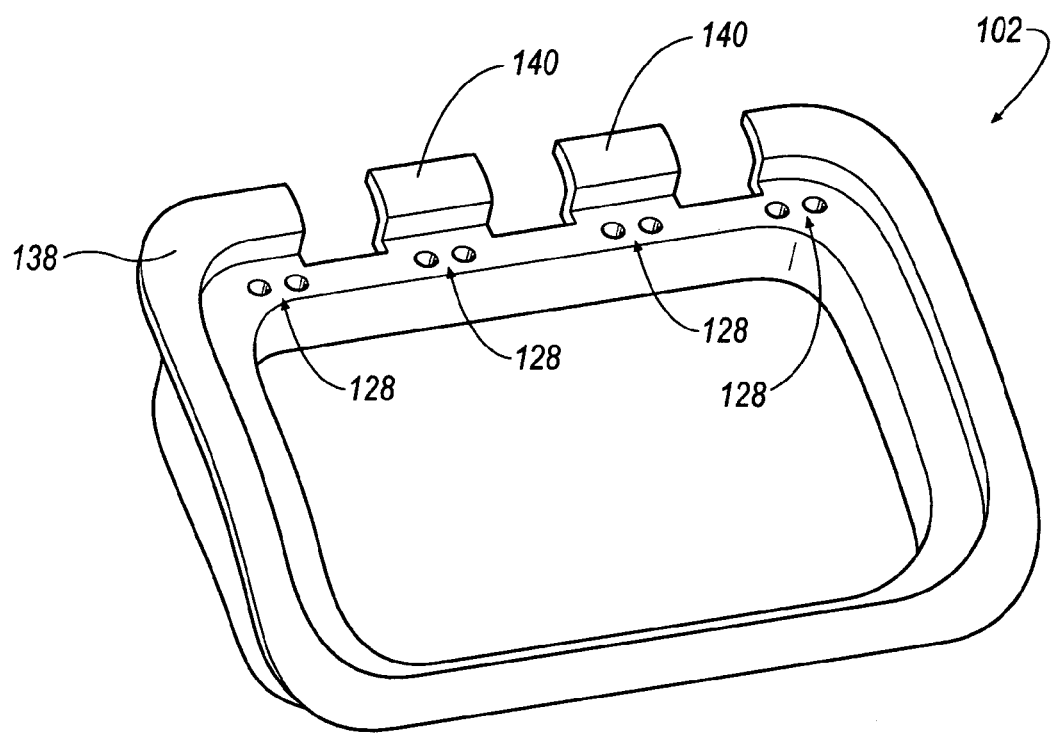
FIG. 5A is a front perspective view of a chute according to an embodiment.
Figure 5B:
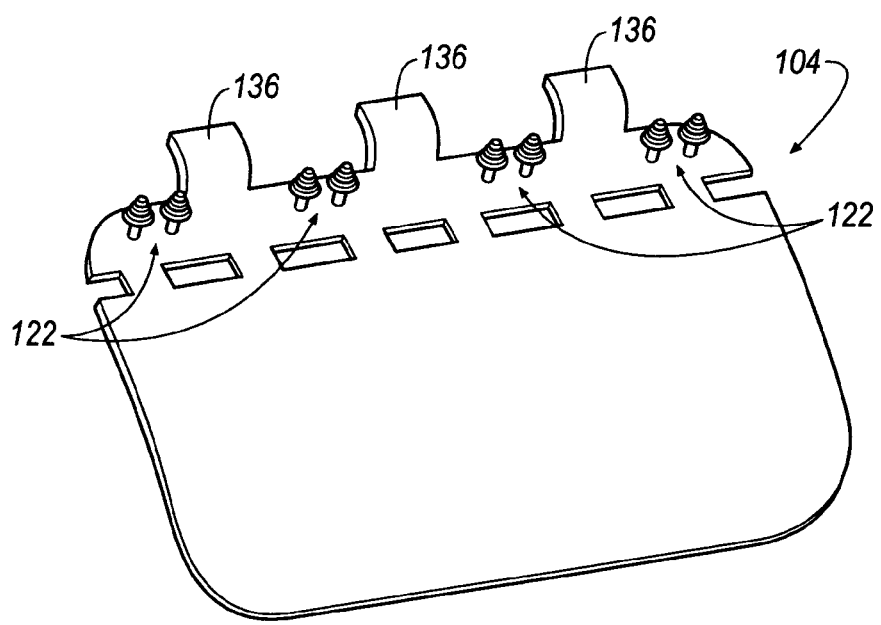
FIG. 5B is a rear perspective view of an air bag door according to an embodiment.
Figure 6:
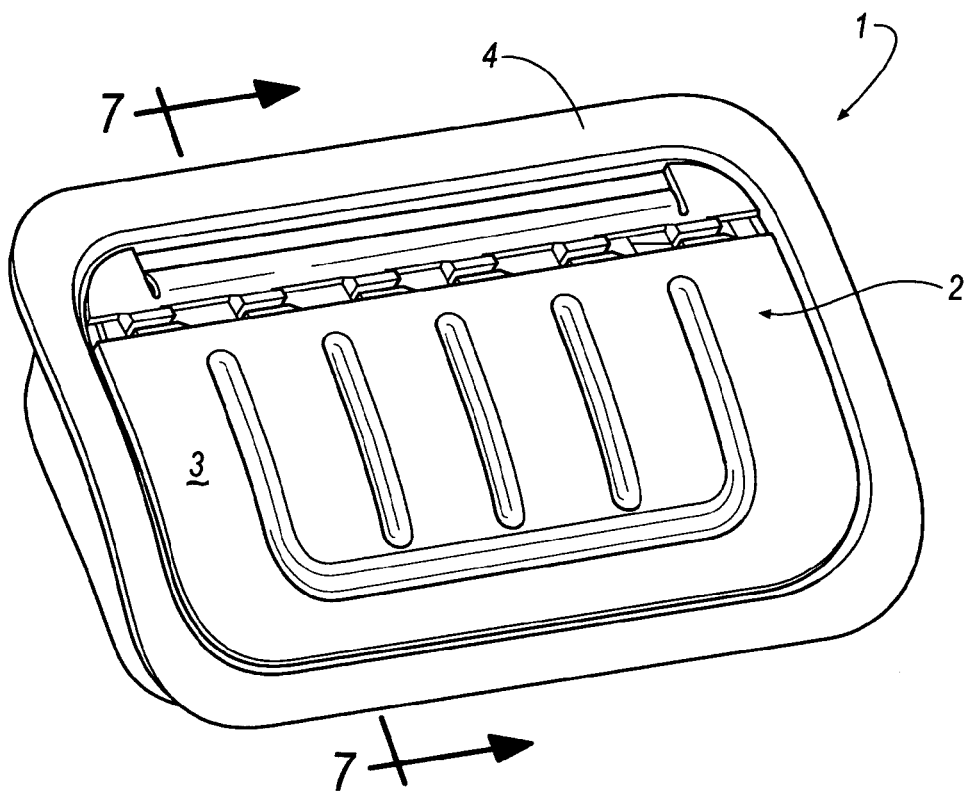
FIG. 6 is a front perspective view of a conventional inflatable restraint assembly.
Figure 7:
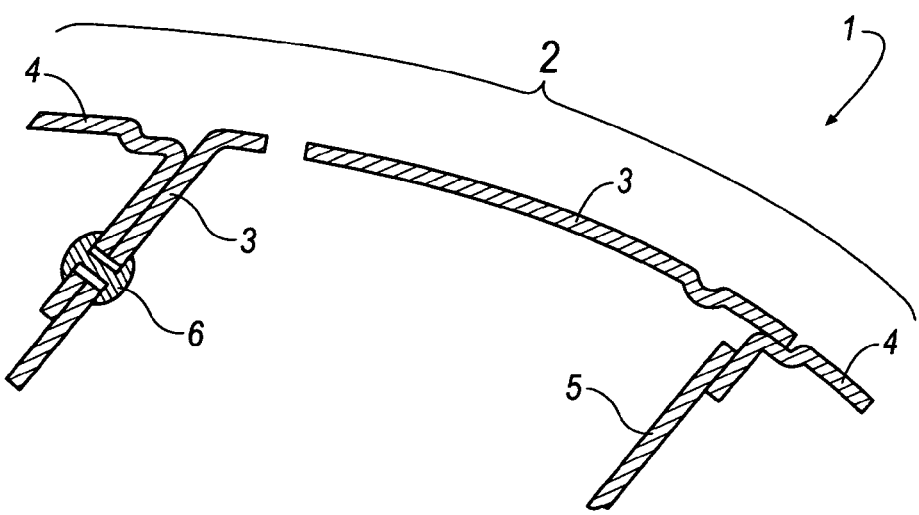
FIG. 7 is a cross-sectional view of the inflatable restraint taken along line 7-7 of FIG. 6.

It will be appreciated that the invention is not limited by the type of interlocking mechanism to retain the door 12 to the chute 14. For example, according to another embodiment of the invention, as seen in FIGS. 5A and 5B, the inflatable restraint assembly may include pairs of Christmas tree-type fasteners 122 extending from the air bag door 104 that correspond to pairs of passages 128 located in a chute 102. Although four snap tabs 22 and corresponding snap tab passages 28 are illustrated in FIGS. 4A, 4B and although eight fasteners 122 and corresponding passages 128 are illustrated in FIGS. 5A, 5B, the inflatable restraint assembly 10 may include any desirable number of snap tabs/fasteners 22, 122 and corresponding passages 28, 128 having any desirable shape to properly retain the door 12 to the chute 14.

Upon interlocking the inflatable restraint assembly 10 as described above, peripheral lip portions 36, 136 of the door 14, 104 are positioned in a same plane of a chute lip perimeter 38, 138 and chute lip tabs 40, 140. Then, the rear-side of the peripheral lip portions 36, 136 and chute lip perimeter 38, 138 may be affixed to an instrument panel (not shown) using any desirable technique. For example, the peripheral lip portions 36, 136 and chute lip perimeter 38, 138 may be vibration welded to the instrument panel. If the chute 12 and the door 14 are affixed in such a technique by vibration welding, it is desirable that the material composition of the chute 12 and door 14 be of a similar material as the instrument panel, such as, for example, thermoplastic olefin (TPO). Other suitable materials for the chute 12 and door 14 may comprise nylon, glass fiber reinforced polypropylene (PP), or the like.

As described above, an improved inflatable restraint assembly 10 reduces the number parts by providing a two-piece assembly rather than a three-piece assembly that is fastened together by a separate fastener. Thus, because the use of a separate fastener is eliminated, an additional manufacturing operation is eliminated. Even further, the number of materials used to form the inflatable restraint assembly is reduced by molding the chute 12, 102 and door 14, 104 from a similar material. When formed of a similar material, the chute 12, 102 and door 14, 104 may be formed in a simplified manufacturing operation by using the same mold tool.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An inflatable restraint assembly comprising:
    an air bag door including at least one fastener integrally-formed with the air bag door; and
    a chute including a recessed upper perimeter that receives the air bag door, and a chute lip perimeter and chute lip portions that mesh with and are positioned in the same plane with peripheral lip portions extending from the air bag door, wherein the at least one fastener is extended through at least one passage formed in the recessed upper perimeter of the chute, and wherein the chute is adapted to interlock with the at least one fastener for retaining said air bag door to said chute.

2. The inflatable restraint assembly according to claim 1, wherein the at least one fastener comprises a snap tab that frictionally engages at least one rib integrally-formed with the chute.

3. The inflatable restraint assembly according to claim 2, wherein the at least one snap tab extends substantially perpendicularly away from an inboard surface of the door, wherein the rib extends from an outboard chute perimeter surface.

4. The inflatable restraint assembly according to claim 3, wherein the at least one snap tab includes a ramped end and a notched section, wherein the rib is located in the notched section to create the interlock effect.

5. The inflatable restraint assembly according to claim 1, wherein the chute and the air bag door is made of one of thermoplastic olefin (TPO), nylon, and glass fiber reinforced polypropylene (PP).

6. A method for manufacturing an inflatable restraint assembly, comprising the steps of:
    integrally forming an air bag door with at least one fastener from a formable material;
    forming a chute from the formable material, wherein the chute includes a recessed upper lip perimeter for receiving the air bag door, a chute lip perimeter, and at least one chute lip tab that is adapted to be aligned with at least one peripheral lip portion of the air bag door.

7. The method according to claim 6, wherein the chute includes at least one rib for interlocking with the at least one fastener.

8. The method according to claim 7, wherein the at least one fastener includes a ramped end and a notched section, wherein the notched section is adapted to receive the at least one rib.

9. A method for assembling an inflatable restraint assembly, comprising the steps of:
    aligning a chute lip perimeter and at least one chute lip tab of a chute with at least one peripheral lip portion of an air bag door;
    receiving the air bag door at a recessed upper lip perimeter of the chute;
    inserting at least one fastener extending from the air bag door into at least one passage formed in the chute;
    interlocking the at least one fastener with the chute; and
    receiving a rib extending from the chute in a notched section of the at least one fastener to interlock the fastener and chute.

10. An inflatable restraint assembly comprising:
    a chute including a chute lip perimeter defining chute lip portions, and a surface defining at least one passage; and
    an air bag door including peripheral lip portions that mesh with the chute lip portions, and at least one fastener that extends through the at least one passage and interlocks the air bag door with the chute, wherein the at least one fastener comprises a snap tab that frictionally engages at least one rib integrally-formed with the chute.

11. The inflatable restraint assembly according to claim 10, wherein the surface of the chute defines a recessed upper perimeter, wherein the chute lip portions are positioned in the same plane with peripheral lip portions.

12. The inflatable restraint assembly according to claim 10, wherein the at least one snap tab extends substantially perpendicularly away from an inboard surface of the door, wherein the rib extends from an outboard chute perimeter surface.

13. The inflatable restraint assembly according to claim 12, wherein the at least one snap tab includes a ramped end and a notched section, wherein the rib is located in the notched section to create the interlock effect.

* * * * *